US010063564B2

(12) United States Patent
Seigel et al.

(10) Patent No.: US 10,063,564 B2
(45) Date of Patent: Aug. 28, 2018

(54) IDENTITY AUTHENTICATION USING MULTIPLE DEVICES

(71) Applicant: QUEST SOFTWARE INC., Aliso Viejo, CA (US)

(72) Inventors: Jake Seigel, Halifax (CA); Sohail Ali, Halifax (CA); Derek Jury, Beachville (CA)

(73) Assignee: Quest Software, Inc., Aliso Viejo, CA (US)

( * ) Notice: Subject to any disclaimer, the term of this patent is extended or adjusted under 35 U.S.C. 154(b) by 86 days.

(21) Appl. No.: 14/877,391

(22) Filed: Oct. 7, 2015

(65) Prior Publication Data
US 2017/0104761 A1    Apr. 13, 2017

(51) Int. Cl.
*H04L 29/06* (2006.01)
*H04W 12/06* (2009.01)
*H04W 4/80* (2018.01)

(52) U.S. Cl.
CPC ........ *H04L 63/107* (2013.01); *H04L 63/0492* (2013.01); *H04L 63/0876* (2013.01); *H04W 4/80* (2018.02); *H04W 12/06* (2013.01)

(58) Field of Classification Search
CPC .................................................... H04L 63/107
See application file for complete search history.

(56) References Cited

U.S. PATENT DOCUMENTS

| | | | | |
|---|---|---|---|---|
| 8,561,142 B1* | 10/2013 | Sobel | ...................... | G06F 21/00 709/203 |
| 9,137,384 B2* | 9/2015 | Pihlajamaki | ............ | H04L 12/14 |
| 9,350,717 B1* | 5/2016 | Siddiqui | .................. | H04L 63/08 |
| 9,430,624 B1* | 8/2016 | Mortensen | .............. | G06F 21/31 |
| 9,485,237 B1* | 11/2016 | Johansson | ............... | H04L 63/08 |
| 9,930,598 B2* | 3/2018 | Ingale | .................... | H04W 36/22 |
| 2012/0252418 A1* | 10/2012 | Kandekar | ............. | H04W 4/021 455/414.1 |
| 2013/0073485 A1* | 3/2013 | Sathish | .................. | G06Q 30/02 706/12 |
| 2013/0314208 A1* | 11/2013 | Risheq | ............... | G07C 9/00158 340/5.53 |
| 2014/0032651 A1* | 1/2014 | Singh | ..................... | H04L 67/10 709/203 |
| 2016/0065558 A1* | 3/2016 | Suresh | .................... | H04L 63/08 726/7 |

(Continued)

OTHER PUBLICATIONS

Alex Varshavsky et al., Amigo: Proximity-Based Authentication of Mobile Devices, UbiComp 2007: Ubiquitous Computing, Lecture Notes in Computer Science, vol. 4717, pp. 253-270, 2007 http://web.cs.toronto.edu/research/profiles/amigo.htm.

(Continued)

*Primary Examiner* — Shawnchoy Rahman
(74) *Attorney, Agent, or Firm* — Maschoff Brennan

(57) ABSTRACT

A system, method, and computer-readable medium for performing an authentication operation comprising: identifying a plurality of user devices associated with a user of an information handling system; determining when at least some of the plurality of user devices are within a predetermined range of the information handling system; and, authenticating the user as an authorized user of the information handling system when at least some of the plurality of user devices are within the predetermined range of the information handling system.

18 Claims, 2 Drawing Sheets

(56) References Cited

U.S. PATENT DOCUMENTS

| | | | | |
|---|---|---|---|---|
| 2016/0149894 A1* | 5/2016 | Jneid | ............... | H04L 63/083 |
| | | | | 726/7 |
| 2016/0180072 A1* | 6/2016 | Ligatti | ............... | G06F 21/34 |
| | | | | 726/7 |
| 2016/0191493 A1* | 6/2016 | Bowman | ............... | H04L 63/083 |
| | | | | 726/9 |
| 2016/0210447 A1* | 7/2016 | Hamlin | ............... | G06F 21/31 |
| 2017/0094638 A1* | 3/2017 | Borges | ............... | H04L 67/1072 |
| 2017/0123492 A1* | 5/2017 | Marggraff | ............... | G06F 3/0236 |
| 2017/0134883 A1* | 5/2017 | Lekutai | ............... | H04W 4/008 |
| 2017/0245105 A1* | 8/2017 | Connelly | ............... | H04W 4/021 |
| 2017/0245106 A1* | 8/2017 | Connelly | ............... | H04W 4/021 |

OTHER PUBLICATIONS

Alex Varshavsky et al., Amigo: Proximity-Based Authentication of Mobile Devices, UbiComp 2007: Ubiquitous Computing, vol. 4717 of the series Lecture Notes in Computer Science, pp. 253-270 http://link.springer.com/chapter/10.1007%2F978-3-540-74853-3_15#page-1.

Wayne Jansen, Proximity-Based Authentication for Mobile Devices, Proceedings of the 2005 International Conference on Security and Management, Jun. 20, 2005, pp. 398-404 http://ebiquity.umbc.edu/_file_directory_papers/464.pdf.

* cited by examiner

IDENTITY AUTHENTICATION USING MULTIPLE DEVICES

BACKGROUND OF THE INVENTION

Field of the Invention

The present invention relates to information handling systems. More specifically, embodiments of the invention relate to identity authentication using multiple devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Often with information handling systems, it is desirable to provide identify authentication. For situations where a company policy enforces a lengthy and complicated password, it can be time consuming when it is necessary to input a password in many times throughout the day. Consider the case where an employee signs in to their information handling system using their password, gets called over to another employee's workspace, has to sign back in when they return, then gets called away again. The process of reentering the password can quickly become tedious and can reduce productivity.

SUMMARY OF THE INVENTION

A system, method, and computer-readable medium are disclosed for performing an authentication operation. In various embodiments the authentication operation includes authenticating a user on an information handling system using a registered device. The authentication operation recognizes that if a user has multiple registered devices in close proximity to their information handling system, it is very likely that this user is who they say they are, similar to having multiple forms of identification. Thus the authentication operation uses multiple devices to confirm a user's identity. In various embodiments, the multiple devices may be considered a swarm of devices which are used for authentication. In various embodiments, the authentication operation can be configured to only be enabled while the information handling system authenticating the user is coupled to a specific network. By so restricting an authentication operation, if a mobile information handling system is misappropriated along with some or all of a swarm of authenticating devices, the mobile information handling system would not be authenticated with the swarm of authenticating devices.

Thus a plurality of registered devices may be used substantially concurrently as an option venue for authentication. In various embodiments, the device comprise at least one of smart phones, tablets, wearable fitness devices, smart watches, employee badges, or other mobile and/or wearable devices. In various embodiments, wireless technology such as Bluetooth or Near Field Communication, are used as the communication method between the devices and the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
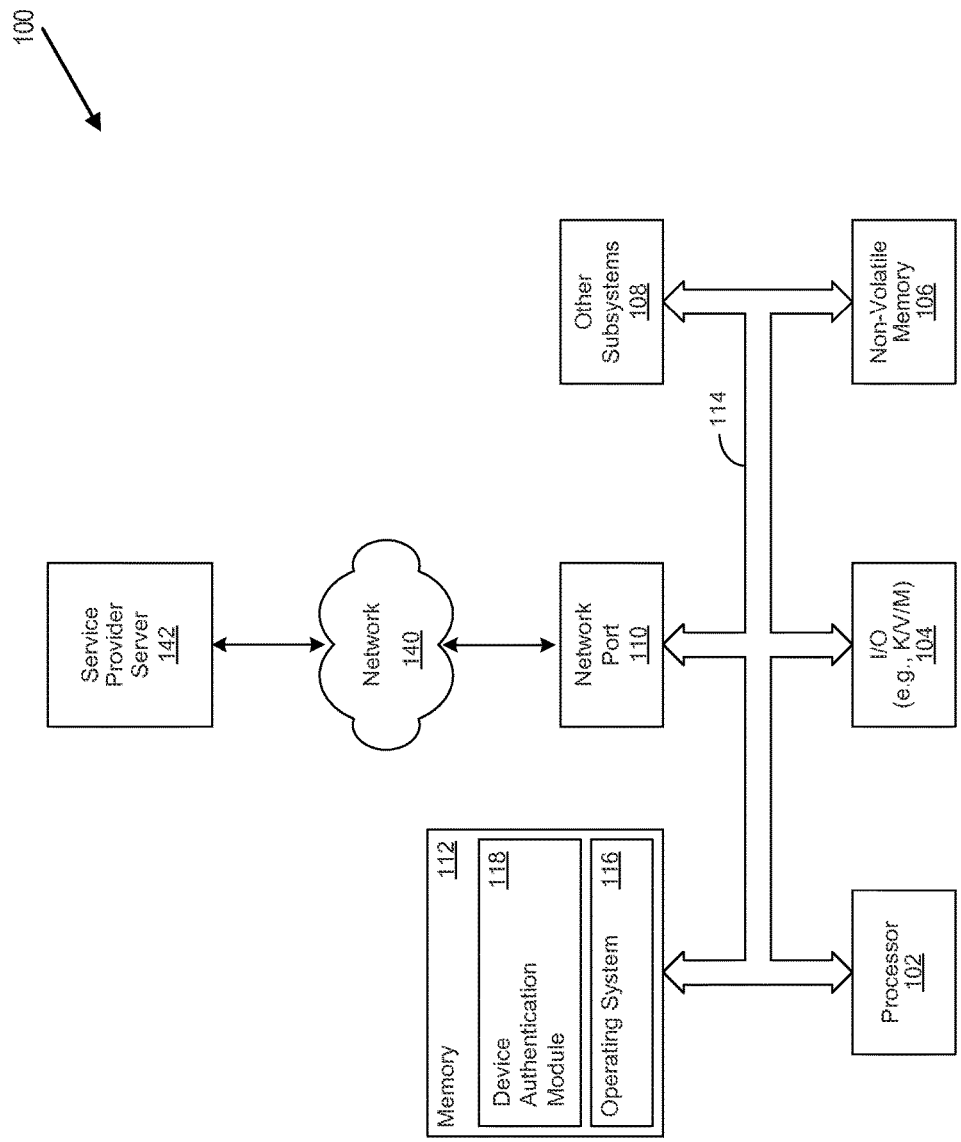
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a device authentication module 118.

The device authentication module 118 performs an authentication operation. In various embodiments the authentication operation includes authenticating a user on an information handling system using a registered device. The authentication operation recognizes that if a user has multiple registered devices in close proximity to their information handling system, it is very likely that this user is who they say they are, similar to having multiple forms of identification. Thus the authentication operation uses multiple devices to confirm a user's identity. In various embodiments, the multiple devices may be considered a swarm of devices which are used for authentication. In various embodiments, the authentication operation can be configured to only be enabled while the information handling system authenticating the user is coupled to a specific network. By so restricting an authentication operation, if a mobile information handling system is misappropriated along with some or all of a swarm of authenticating devices, the mobile information handling system would not be authenticated with the swarm of authenticating devices.

Thus a plurality of registered devices may be used substantially concurrently as an option venue for authentication. In various embodiments, the device comprise at least one of smart phones, tablets, wearable fitness devices, smart watches, employee badges, or other mobile and/or wearable devices. In various embodiments, wireless technology, such as Bluetooth or Near Field Communication (NFC) are used as the communication method between the devices and the information handling system.

Figure 2:
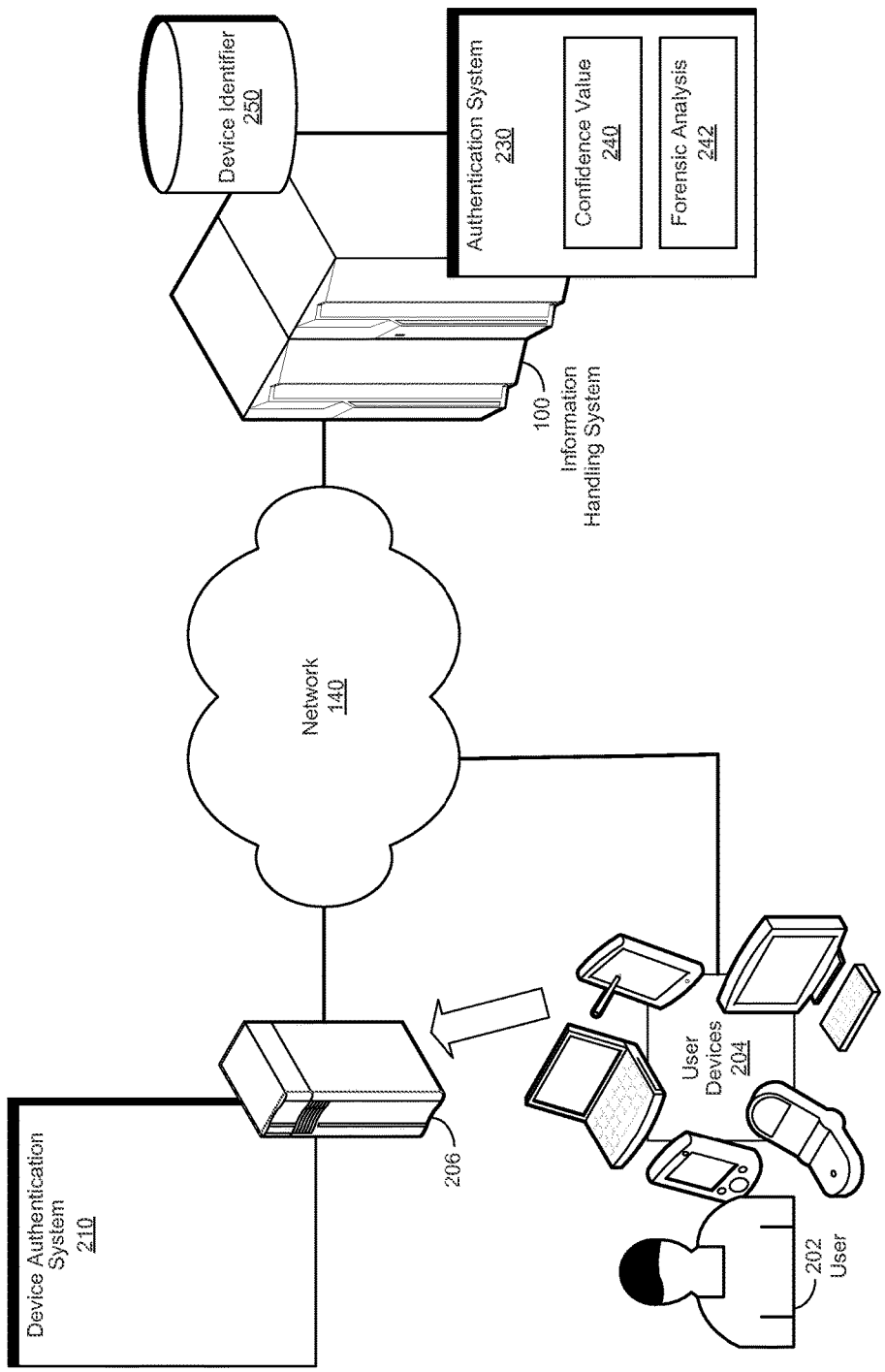
FIG. 2 shows a block diagram of an authentication environment.

FIG. 2 is a simplified block diagram of a device authentication environment 200 implemented in accordance with an embodiment of the invention. In various embodiments, a user 202 has access to one or more user devices 204 as well as a user associated information handling system 206 on which an authentication system 210 is executing.

As used herein, a user device 204 refers to a device which is associated with the user. In various embodiments, the user device 204 can also include an information handling system such as a personal computer, a laptop computer, a tablet computer, a personal digital assistant (PDA), a smart phone, a mobile telephone, or other device that is capable of communicating and processing data such as a smart watch type device. In various embodiments, the user device 204 can also include passive devices such as a user badge. In various embodiments a plurality of user devices 204 are used to perform an authentication operation on the information handling system 206 associated with the user 202.

In various embodiments, the user device 204 is used to exchange information between the user 202 and a service provider information handling system 100 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

The authentication operation uses a swarm of devices to be either registered by the user (by having the organization learn and recognize device identifiers for each of the swarm of devices) or learned by the information handling system (by seeing these same devices in proximity over time). In certain embodiments, the authentication operation performs a one-time determination of the proximity of the user's devices at the time of authentication.

More specifically, in various embodiments, the device identifiers are collected by the information handling system 206 when the user authenticates the information handling system. In certain embodiments, the device identifiers are detected by the information handling system 206 using wireless technology (such as Near-Field Communication, Bluetooth, etc.).

In certain embodiments, when performing an authentication operation, the user registers each device 204 with the authentication system 210 and associates each device with the identity of the user. In certain embodiments, the authentication system 210 includes an administration console to facilitate the registration of each device. Such an authentication allows the authentication operation to generate a confidence value based upon the types of devices and how many devices are used during sign-in. The confidence value can then be used to determine how confident the authentication system 210 is that a particular user is who they say they are during sign-in. In various embodiments, this confidence value can be audited with the sign-in success or fail event for future forensic analysis.

In certain other embodiments, when performing an authentication operation, the authentication system 210 performs a learning operation during which devices are associated with a user over time. During this learning operation, the authentication operation detects new device identifiers during sign-in, adds the device identifiers to a discovered devices list and associate the discovered devices with the authenticated user. In certain embodiments, information regarding each of the devices is stored within a data store associated with the authentication system 210. Over time, the authentication system 210 learns which devices a user typically has within close proximity to them. Such a learning operation allows the authentication system 210 to increase the calculated confidence value during sign-in.

The authentication system 210 may use one or more of a plurality of operations to store the device identification data and to associate this device identification data with the user. For example, in certain embodiments, directory service metadata is used to associate devices with the user. In these embodiments, the authentication system stores the device identifiers in a device identifier repository (e.g., a database) and associates the device identifiers with a user identity within the device identifier repository. This device identifier repository is queried whenever a user attempts to sign in to their information handling system 206. The query compares the detected device identifiers to the known device identifiers associated with this user in the device identifier repository.

Additionally, certain embodiments calculate a confidence value based on the match strength between the two data sets. For embodiments that have learned over time what devices are "normal" or "expected", the authentication system 210 applies weights during this confidence calculation to represent this learned data. For these "learning-based" systems, the device identifier repository is updated at each authentication time to help the system learn what is normal.

Additionally, in certain embodiments, the user should be within a predetermined usage range of the information handling system 206 for the user to be authenticated. In various embodiments, the predetermined usage range is based upon a proximity (e.g., within 10 feet) of the user to the information handling system 206. Authenticating the user based upon the predetermined usage range is a part of layered approach to security, where the user may also be signing in with their credentials or other authentication technique. Ultimately, the proximity range for the authentication to take place is limited by the underlying wireless technology and the rules for valid distance from the information handling system 210 and is likely controlled via signal strength of the information handling system and the devices.

The authentication system 210 can also enable a forensic analysis of access to a particular information handling system. For example, consider a use-case where a first user has an information handling system 206 which includes an authentication system 210 and the user uses the authentication operation while signing into their information handling system 206. The first user frequently has a plurality of devices in proximity to the information handling system when signing on to the information handling system. These devices might include for example, a network connected health device on his wrist, a smart phone in his shirt pocket, a pedometer type of device (e.g., smart shoes) that count the number of steps he takes, and a tablet at his desk. As the first user signs in, the authentication system 210 notes that the first user has all of these devices in range and this is normal for him (as the authentication system 210 has learned over the previous months). At some point, the first user leaves his information handling system unattended at which time another user accesses the information handling system using misappropriated credentials (e.g., a stolen password) to perform some sort of malicious activity using the first user's information handling system. The company's auditing process identifiers the malicious activity and generates a notification to an administrator and the owner of the resource on which the malicious activity is performed. Eventually the first user is confronted with the malicious activity and rightfully claims he didn't perform the malicious activity. By using a forensic analysis of the authentication system 210, it is possible to determine that at the time of the malicious activity there was a log on that took place that did not have the usual devices present. It is possible to determine from this information that the first user was not the user who signed into the information handling system 210 at that time.

Also, in certain embodiments, the environment 200 further includes a higher level authentication system 230. The higher level authentication system 230 interacts with a plurality of user information handling systems 206 and a plurality of authentication systems 210. The higher level authentication system 230 includes a confidence value module 240 and a forensic module 242 as well as an associated higher level device identifier repository 250. The higher level authentication system 230 enables system administrators to have a view of the authentication activities of information handling systems for which they are responsible. In certain embodiments, the higher level authentication system 230 enables remote storage and management of the device identification data from a plurality of user information handling systems.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method, comprising:
   registering a first user device associated with a user with an information handling system;
   registering a second user device associated with the user with the information handling system;
   determining that the first user device and the second user device are connected to a network associated with the information handling system;
   receiving an authentication request from the first user device, the authentication request including an identifier of the first user device;
   accessing an electronic record of the user based on the first user device to determine an identity of the user and other user devices that are registered with the user;
   identifying the second user device in the electronic record;
   determining that the first user device and the second user device are within a predetermined range of the information handling system based on a detected signal strength for each of the first user device and the second user device to the network;
   determining a confidence value based on at least one of: the first user device, the second user device, a type of device for the first user device, and a type of device of the second user device; and
   authenticating the user as an authorized user of the information handling system (a) based on the first user device and the second device both being connected to the network, (b) when both the first user device and the second device are within the predetermined range of the information handling system, the authenticating using the first user device and the second user device to confirm an identity of the user for the user to access the information handling system, and (c) based on the confidence value being within a confidence value threshold.

2. The method of claim 1, wherein:
   the authenticating is configured to only be enabled while the information handling system authenticating the user is coupled to the network.

3. The method of claim 1, wherein:
   the first user device and the second user device comprise at least one of a smart phone type information handling system, a tablet type information handling system, a wearable fitness device, a smart watch, and an employee identification badge.

4. The method of claim 1, wherein:
   a wireless communication technology is used to communicate between the first user device and the second user device and the information handling system.

5. The method of claim 1, wherein:
   registering the first user device and the second user device further comprises determining a device identifier associated with each of the first user device and the second user device; and,
   the authenticating further comprises comparing the device identifier associated with each of the first user device and the second user device with a previously stored device identifier for each of the first user device and the second user device.

6. The method of claim 1, wherein:
   the authenticating further comprises a learning operation, the learning operation identifying user devices within a predetermined range of the information handling system when the user is identified as an authorized user of the information handling system.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions that, when executed by the processor, cause the system to perform operations comprising:
   register a first user device associated with a user with an information handling system;
   register a second user device associated with the user with the information handling system;
   determine that the first user device and the second user device are connected to a network associated with the information handling system
   receive an authentication request from the first user device, the authentication request including an identifier of the first user device;
   access an electronic record of the user based on the first user device to determine an identity of the user and other user devices that are registered with the user;
   identify the second user device in the electronic record;
   determine that the first user device and the second user device are within a predetermined range of the information handling system based on a detected signal strength for each of the first user device and the second user device to the network; and,
   determine a confidence value based on at least one of: the first user device, the second user device, a type of device for the first user device, and a type of device of the second user device;
   authenticate the user as an authorized user of the information handling system (a) based on the first user device and the second device both being connected to the network, (b) when both the first user device and the second device are within the predetermined range of the information handling system, the authenticating using the first user device and the second user device to confirm an identity of the user for the user to access the information handling system, and (c) based on the confidence value being within a confidence value threshold.

8. The system of claim 7, wherein:
   the authenticating is configured to only be enabled while the information handling system authenticating the user is coupled to the network.

9. The system of claim 7, wherein:
   the first user device and the second user device comprise at least one of a smart phone type information handling system, a tablet type information handling system, a wearable fitness device, a smart watch, and an employee identification badge.

10. The system of claim 7, wherein:
    a wireless communication technology is used to communicate between the first user device and the second user device and the information handling system.

11. The system of claim 7, wherein:
  registering the first user device and the second user device further comprises determining a device identifier associated with each of the first user device and the second user device; and,
  the authenticating further comprises comparing the device identifier associated with each of the first user device and the second user device with a previously stored device identifier for each of the first user device and the second user device.

12. The system of claim 7, wherein:
  the authenticating further comprises a learning operation, the learning operation identifying user devices within a predetermined range of the information handling system when the user is identified as an authorized user of the information handling system.

13. A non-transitory, computer-readable storage medium embodying computer program code, the computer program code comprising computer executable instructions that, when executed by a processor, cause a system to perform operations comprising:
  registering a first user device associated with a user with an information handling system;
  registering a second user device associated with the user with the information handling system;
  determining that the first user device and the second user device are connected to a network associated with the information handling system;
  receiving an authentication request from the first user device, the authentication request including an identifier of the first user device;
  accessing an electronic record of the user based on the first user device to determine an identity of the user and other user devices that are registered with the user;
  identifying the second user device in the electronic record;
  determining that the first user device and the second user device are within a predetermined range of the information handling system based on a detected signal strength for each of the first user device and the second user device to the network;
  determining a confidence value based on at least one of: the first user device, the second user device, a type of device for the first user device, and a type of device of the second user device; and
  authenticating the user as an authorized user of the information handling system (a) based on the first user device and the second device both being connected to the network, (b) when both the first user device and the second device are within the predetermined range of the information handling system, the authenticating using the first user device and the second user device to confirm an identity of the user for the user to access the information handling system, and (c) based on the confidence value being within a confidence value threshold.

14. The non-transitory, computer-readable storage medium of claim 13, wherein:
  the authenticating is configured to only be enabled while the information handling system authenticating the user is coupled to the network.

15. The non-transitory, computer-readable storage medium of claim 13, wherein:
  the first user device and the second user device comprise at least one of a smart phone type information handling system, a tablet type information handling system, a wearable fitness device, a smart watch, and an employee identification badge.

16. The non-transitory, computer-readable storage medium of claim 13, wherein:
  a wireless communication technology is used to communicate between the first user device and the second user device and the information handling system.

17. The non-transitory, computer-readable storage medium of claim 13, wherein:
  registering the first user device and the second user device further comprises determining a device identifier associated with each of the first user device and the second user device; and,
  the authenticating further comprises comparing the device identifier associated with each of the first user device and the second user device with a previously stored device identifier for each of the first user device and the second user device.

18. The non-transitory, computer-readable storage medium of claim 13, wherein:
  the authenticating further comprises a learning operation, the learning operation identifying user devices within a predetermined range of the information handling system when the user is identified as an authorized user of the information handling system.

* * * * *